United States Patent [19]

Murakami et al.

[11] Patent Number: 4,534,334

[45] Date of Patent: Aug. 13, 1985

[54] EXHAUST-GAS RECIRCULATION SYSTEM FOR INTERNAL COMBUSTION ENGINE

[75] Inventors: Nobuaki Murakami; Shogo Oomori, both of Kyoto, Japan

[73] Assignee: Mitsubishi Jidosha Kogyo Kabushiki Kaisha, Tokyo, Japan

[21] Appl. No.: 580,084

[22] Filed: Feb. 14, 1984

[30] Foreign Application Priority Data

Feb. 18, 1983 [JP] Japan .................................. 58-26021

[51] Int. Cl.³ .......................................... F02M 25/06
[52] U.S. Cl. .................................................. 123/571
[58] Field of Search .................. 123/568, 569, 571

[56] References Cited

U.S. PATENT DOCUMENTS

| | | | |
|---|---|---|---|
| 4,378,776 | 4/1983 | Nishimori | 123/571 |
| 4,378,777 | 4/1983 | Iida et al. | 123/571 |
| 4,448,177 | 5/1984 | Hasegawa et al. | 123/571 |
| 4,448,178 | 5/1984 | Yamato et al. | 123/571 |
| 4,466,416 | 8/1984 | Kawamura | 123/571 |

FOREIGN PATENT DOCUMENTS 0151252 11/1981 Japan .

*Primary Examiner*—Parshotam S. Lall
*Assistant Examiner*—W. R. Wolfe
*Attorney, Agent, or Firm*—Robert E. Burns; Emmanuel J. Lobato; Bruce L. Adams

[57] ABSTRACT

An exhaust-gas recirculation (EGR) system has a main control device that supplies a control signal to an EGR valve actuating device that opens an EGR valve to a desired extent. Under normal conditions, a pulse actuating signal having a time-width corresponding to a difference between the actual opening of the EGR valve and the desired opening is supplied to the valve actuating device. Then, the next actuating signal is fed to the valve actuating device after a given length of quiescent time. When the desired opening changes suddenly, however, the normal operation is discontinued and an actuating signal corresponding to a new desired opening is supplied to the valve actuating device. By so doing, the EGR valve is at all times opened to the desired extent, not only under normal conditions but also when the desired amount of valve opening changes suddenly.

5 Claims, 5 Drawing Figures

EXHAUST-GAS RECIRCULATION SYSTEM FOR INTERNAL COMBUSTION ENGINE

BACKGROUND OF THE INVENTION

1. Field of the Invention

This invention relates to an exhaust-gas recirculation system for the internal combustion engine that reduces the formation of pollutants in the exhaust gas by lowering the combustion temperature by recycling part of the exhaust gas back to the intake system of the engine.

2. Description of the Prior Art

In internal combustion engines, especially gasoline engines, large quantities of nitrogen oxide ($NO_x$) is formed as the combustion temperature rises under certain operating conditions. To prevent the formation of $NO_x$, an exhaust-gas recirculation system (hereinafter abbreviated EGR system) that lowers the combustion temperature by sending a portion of the inert exhaust gas back to the combustion chamber has been used. The EGR system usually opens or closes an exhaust-gas recirculation (EGR) valve that controls the amount of the returned exhaust gas according to operating conditions that manifest themselves as changes in the cooling water temperature and engine vacuum. There is an EGR system, for example, that introduces the engine vacuum from the intake system through a change-over valve to a diaphragm chamber to open or close and exhaust-gas recirculation (EGR) valve connected to the diaphragm at a preset time. With another EGR system, operating conditions of the engine are translated into electric signals. By using such signals, the amount of EGR valve opening needed to achieve the desired operating condition is calculated. Then, the control device outputs such a signal that allows the EGR valve to open or close to the extent desired. With the latter type, a desired amount of the valve opening a is set based on the the operating conditions of the engine at sampling intervals of Ts as shown in FIG. 1. As the desired amount a varies and deviates by $\epsilon_1$ from the actual amount of lift b, which represents the extent to which the EGR valve actually opens or closes, the control device generates a pulse having a time-width $T_{pwl}$ that is proportional to a difference $\epsilon_1$, which is then translated into an actuating signal f for a valve opening solenoid. After this, a quiescent time $T_w$ of a given length is given to stabilize the control. Once the pulse $T_{pw1}$ is outputted, however, it is impossible to proceed to the next action until the quiescent time $T_w$ is over. Thus, even if the desired value a changes at point $T_2$, the actuating signal f continues the output with a time-width $T_{pw1}$. It is not until point $T_3$ is reached after the passage of the quiescent time $T_w$ that a pulse having a time-width $T_{pw2}$ proportional to a difference $\epsilon_2$ is outputted. As will be understood from the above, the conventional EGR system of the type being described cannot avoid wasting as much time as $T_L$. Accordingly, the actual position (or amount of lift) b of the EGR valve can be adjusted in close conformity with such a gentle change in the desired value a as shown in FIG. 2(a). But close follow-up sometimes becomes impossible when changes are as sudden as those shown at (b) and (c) in FIG. 2. In FIGS. 1 and 2, reference character f designates an actuating signal that causes the EGR valve to move in the opening direction and reference character g denotes an actuating signal that causes the same valve to move in the closing direction.

SUMMARY OF THE INVENTION

The object of this invention is to provide an EGR system equipped with an EGR valve that can follow up without delay any sudden change in the desired amount of valve opening.

In order to achieve this object, an exhaust-gas recirculation (EGR) system for the internal combustion engine according to this invention comprises, in combination, an exhaust-gas recirculation passage through which a portion of the exhaust gas is sent back to the intake system, an exhaust-gas recirculation control valve provided in said passage, means actuating said control valve in such a manner that the opening thereof changes continuously, a valve opening sensor that generates an actual valve opening signal corresponding to the actual opening of said control valve, a detecting means for detecting the operating conditions of the internal combustion engine, and a main control device supplying an output signal to said valve actuating means, the main control device being equipped with means setting a desired opening amount of said control valve based on a signal sent from said detecting means, comparing means detecting a difference between the desired opening amount and the actual valve opening detected by said valve opening sensor, means the senses, judges and sets a sudden change in the desired opening amount, means setting a given length of quiescent time, and pulse actuating means supplying an output signal to said valve actuating means and being adapted to withhold the output of the next actuating signal during the quiescent time preset by said quiescent time setting means after said pulse actuating means outputs an actuating signal whose length corresponds to the difference detected by said comparing means and outputs an actuating signal whose length corresponds to a new difference, based upon the signal supplied from said sudden change judging means, when the desired value changes suddenly. To put it more briefly, the EGR system according to this invention comprises a main control device that supplies an actuating signal to valve actuating means that keeps the opening of an EGR valve at a desired level. Particularly, the main control device has a characteristic function to detect a sudden change in the desired valve opening by means of said sudden change judging means, to immediately discontinue the normal operation, and to output an actuating signal corresponding to a newly set desired valve opening.

Accordingly, the EGR system according to this invention permits controlling the opening of an EGR valve to the desired amount not only under normal operating conditions but also when the desired valve opening changes suddenly.

DESCRIPTION OF THE PREFERRED EMBODIMENT

Figure 1:
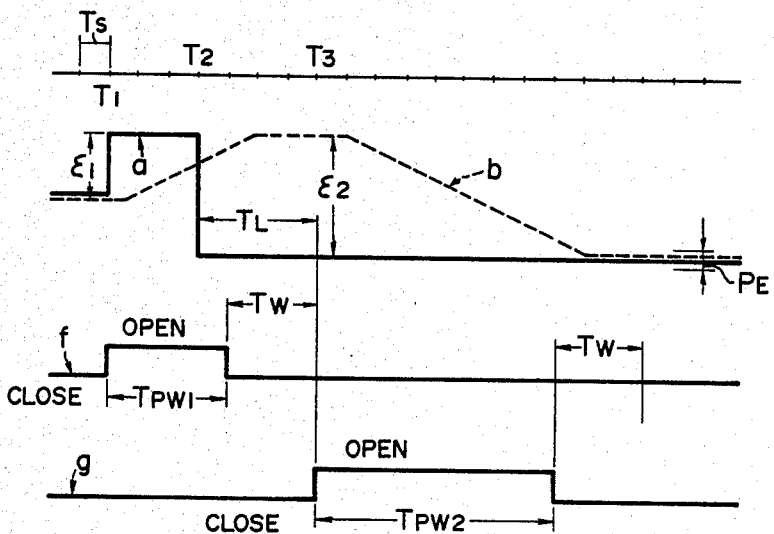
FIG. 1 is an operation timing chart of a conventional EGR system.
Figure 3:
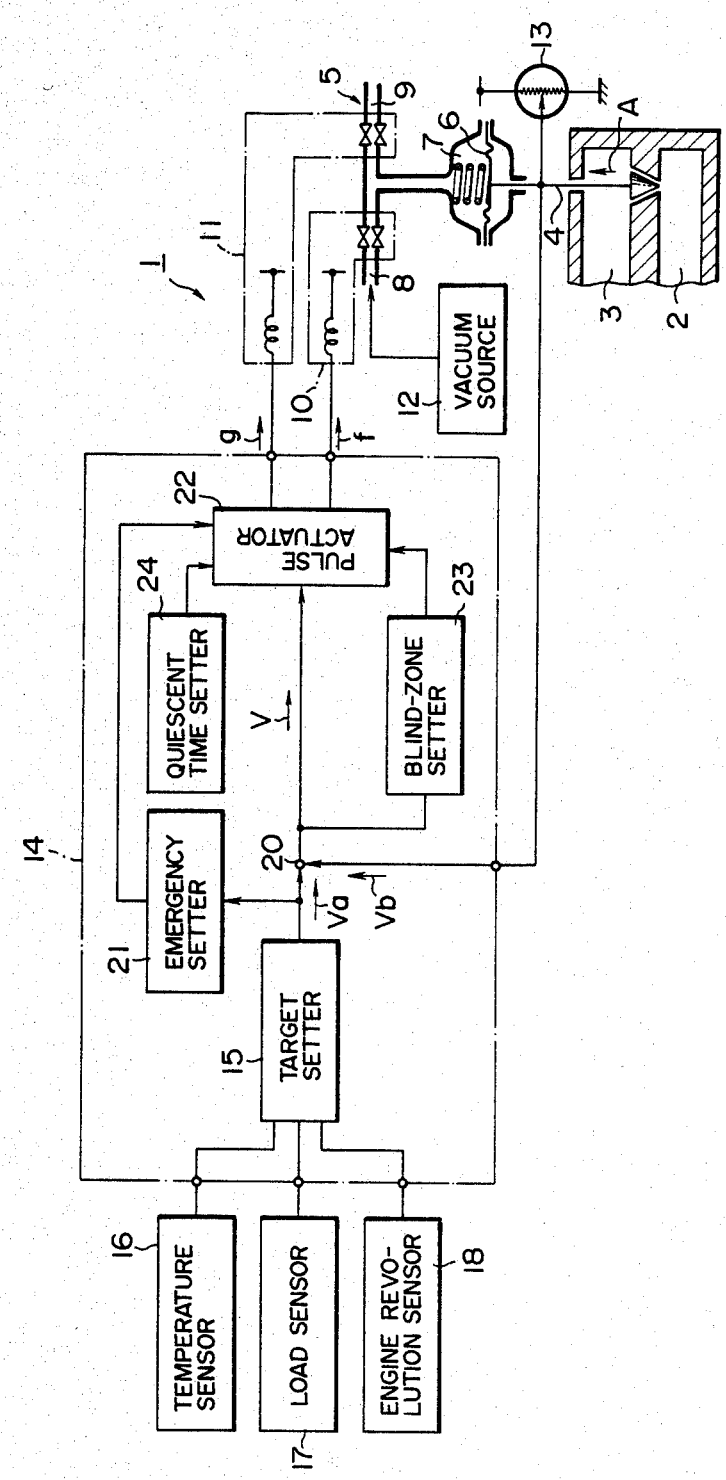
FIG. 3 is a block diagram showing essential elements of an EGR system embodying the principle of this invention.

The invention will be hereinafter described in detail by reference to the accompanying drawings, in which reference characters used in FIG. 1, such as a, b, f, g, and T, are also used in other figures to designate similar parts to the extent that no confusion is caused. FIG. 3 shows an EGR system 1 embodying the principle of this invention. This EGR system opens and closes an exhaust-side recirculation passage 2 communicating with the exhaust system of a gasoline engine not shown and an intake-side recirculation passage 3 communicating with the intake system of the same engine by means of an EGR valve 4. The valve body of the EGR valve 4 is a needle valve which changes the effective cross-sectional area of the recirculation passage as it ascends or descends in the lifting direction indicated by A. The amount of exhaust-gas recirculated varies in proportion to the effective cross-sectional area. The EGR valve 4 whose opening or amount of lift is varied by valve driving means 5 comprises a diaphragm 6 fitted with a return spring, a vacuum chamber 7 sealed by the diaphragm 6, a vacuum passage 8 and an atmosphere passage 9 both communicating with the vacuum chamber 7, a first solenoid valve 10 that opens and closes the vacuum passage 8, and a second solenoid valve 11 that opens and closes the atmosphere passage 9. Reference numeral 12 designates a vacuum source which may be the vacuum in the intake passage or a vacuum tank equipped with a vacuum pump not shown. To the EGR valve 4 is attached a valve displacement sensor (hereinafter called a lift sensor) 13 which generates an actual displacement signal corresponding to the amount of lift b that determines the opening of the EGR valve 4. This actual displacement signal is fed as a feedback signal to a main control device 14 described later.

The main control device 14 is connected to the first and second solenoid valves 10 and 11. The main control device 14 is made up of a microcomputer as funcitionally shown in FIG. 3. The main control device 14 has a target setter 15 to which are connected a temperature sensor 16 that emits an electric signal according to the temperature of cooling water, a load sensor 17 that emits an electric signal according to the engine load, and an engine revolution sensor 18 that emits an electric signal according to the engine revolution. Based upon the signals supplied from these sensors, the target setter 15 senses the operating conditions of the engine and determines the amount of recirculated exhaust gas suited thereto using characteristic data preliminarily inputted. Next, the lifting amount of the EGR valve 4 to provide the determined recirculated exhaust gas is derived from another characteristic data preliminarily inputted. The derived lifting amount becomes a target a which is outputted as a target signal $V_a$.

The target signal $V_a$ from the target setter 15 is inputted in a comparator 20 and a device that judges a sudden change in the desired opening amount and sets a corresponding signal (hereinafter called an emergency setter) 21. Receiving the target signal $V_a$ and the actual displacement signal $V_b$ from the lift sensor 13, the comparator 20 feeds a differential signal V (which corresponds to a difference $\epsilon$ between the target value a and the actual lifting amount b) to a pulse actuator 22.

Figure 4:
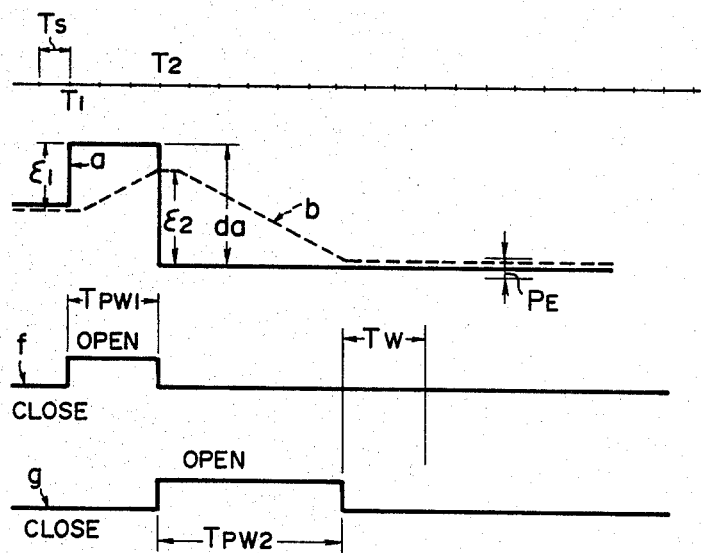
FIG. 4 is an operation timing chart of the EGR system shown in FIG. 3.

The pulse actuator 22 generates a pulse having a time-width proportional to the differential signal V as an actuating signal. Depending upon whether the difference is positive or negative (here $\epsilon_1$ and $\epsilon_2$ shown in FIG. 4 are positive and negative, respectively) or whether the valve is to be raised or lowered, the pulse is fed to the first solenoid valve 10 or second solenoid valve 11. Reference numerals 23 and 24 respectively designate a blind-zone setter and a quiescent time setter. The blind-zone setter 23 stops the pulse generating action of the pulse actuator 22 when the difference $\epsilon_1$ is below the preset value $P_E$ (see FIG. 4). The quiescent-time setter 24 sets a quiescent time $T_W$ during which the result of pulse-induced actuation does not appear in the actual lifting amount b because of the operational delay in the entire control system and holds back the generation of a new pulse during that time.

The emergency setter 21 detects a change in the aimed-for value a and allows the pulse actuator 22 to follow a force-actuation pattern when the change exceeds a preset limit. When this pattern sets in, all the actions set by the actuating signals including the generation of a pulse being outputted and the waiting for the passage of the quiescent time $T_W$ are forcibly discontinued. Then, the pulse actuator 22 is caused to output a new actuating signal corresponding to a new target value of that moment. Namely, the pulse actuator 22 outputs a pulse having a time-width corresponding to the difference between the new target value and the actual lifting amount as a driving signal f or g.

Referring now to a timing chart in FIG. 4, the operation of the EGR system 1 shown in FIG. 3 will be described.

Assume that the operating conditions of the engine detected by the temperature sensor 16, load sensor 17 and engine revolution sensor 18 point to a normal running following the completion of warm-up and that the actual lifting amount b of the EGR valve 4 is substantially equal to the target value a. If the target value a changes greatly in the direction to raise the EGR valve with a change in the operating conditions of the engine that takes place during a sampling period $T_s$, a pulse having a time-width $T_{pw1}$ proportional to the difference $\epsilon_1$ is fed as the actuating signal f to the first solenoid valve 10. Then, the EGR valve 4 rises, with a delay indicated by the broken line, with a resulting change in the actual lifting amount b. If the target value a changes again at time point $T_2$ within the time-width $T_{pw1}$ and the ratio of change da exceeds a preset limit, the emergency setter 21 works to put the pulse actuator 22 into a forced drive pattern, whereby the actuating signal f is stopped and a pulse having a time-width $T_{pw2}$ proportional to the difference $\epsilon_2$ at said time point $T_2$ is fed to the second solenoid valve 11 as an actuating signal g. Then pulse generation is discontinued because the engine operates normally, with the target value a remaining unchanged during the time-width $T_{pw2}$ and the difference remaining smaller than the preset value $P_E$ even after the passage of the quiescent time $T_w$.

With the EGR system 1 just describes by reference to FIG. 3, the emergency setter 21 puts the pulse actuator 22 in a forced actuation pattern to output an actuating signal corresponding to a new target value when the target value a changes suddenly, discontinuing the normal operation. This eliminates the time loss $T_L$ shown in FIG. 1 and imparts an improved responsiveness to the EGR system 1.

Figure 2:
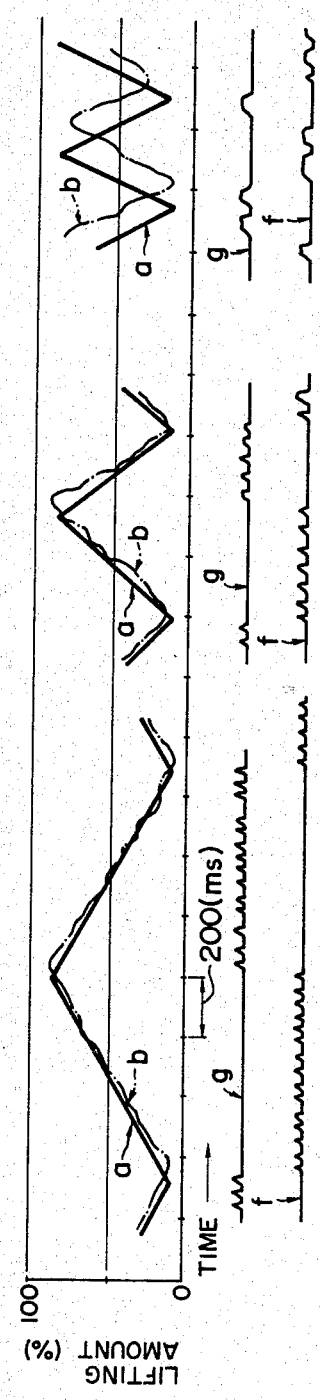
FIG. 2 shows operation timing charts of a conventional EGR system without forced actuation.
Figure 5:
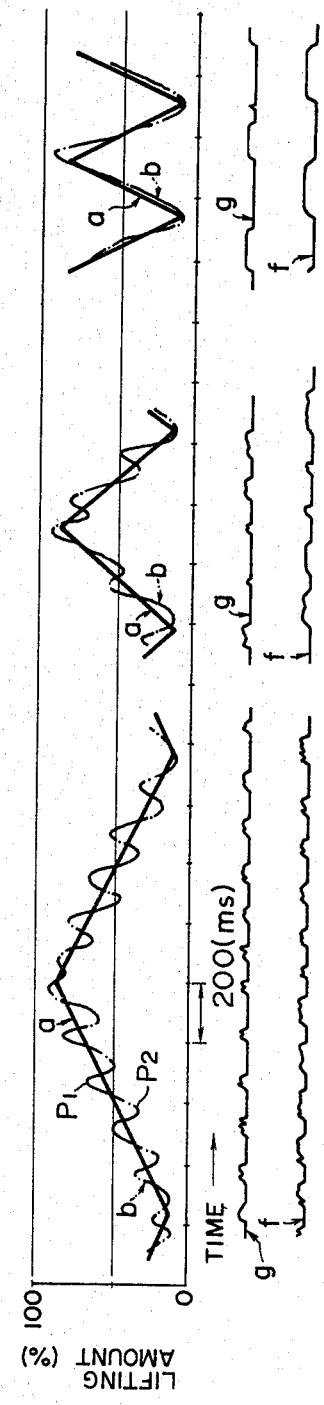
FIG. 5 shows operation timing charts of an EGR system according to this invention with forced actuation.

FIG. 5 shows timing charts of the EGR system 1 that is operated with target values similar to those shown in FIG. 2. In the case shown at (c) of FIG. 5 in which the target value a changes greatly, the forced actuation pattern sets in, unlike the case of FIG. 1(c), to maintain high enough responsiveness to allow the actual lifting amount b to follow up the change in the target value a with a minimum of delay. When the target value a changes only to a small extent as shown at (a) and (b) of FIG. 5, however, adequate quiescent time cannot be taken and the resulting failure of the actual lifting amount b to closely follow up the actuating signal f or g leads to the repeated occurence of overshoot $P_1$ or undershoot $P_2$ which, in turn, results in hunting. However, if the reference level for judging a sudden change in the target value is set with this hunting in mind (so that, for example, normal operation is continued when the change in the target value a is of the magnitude as shown at (a) and (b) of FIG. 5), the responsiveness can be improved without impairing the system stability.

The value actuating apparatus in the embodiment just described comprises the diaphragm 6, vacuum source 12, first and second solenoid valves 10 and 11, and so on. The EGR valve may be actuated by a piston sliding in an air cylinder, instead of the diaphragm 6, or otherwise by the solenoid valves alone.

What is claimed is:

1. An exhaust-gas recirculation system for an internal combustion engine comprising: an exhaust-gas recirculation passage through which a portion of the exhaust gas from the internal combusion engine is sent back to an intake system, an exhaust-gas recirculation control valve disposed in said passage, valve actuating means for actuating said control valve in such a manner to continuously control the opening thereof, a valve opening sensor for generating an actual valve opening signal corresponding to the actual opening of said control valve, detecting means for detecting certain operating conditions of the internal combustion engine, and a main control device for supplying an output signal to said valve actuating means, said main control device having means for setting a desired opening amount of said control valve based on a signal sent from said detecting means, comparing means for detecting a difference between the desired opening amount and the actual valve opening detected by said valve opening sensor, sensing means for sensing, judging and setting a sudden change in the desired opening amount, means for setting a given length of quiescent time, and pulse actuating means for supplying actuating signals to said valve actuating means and operative to withhold the supply of the next actuating signal during the quiescent time preset by said quiescent time setting means after said pulse actuating means supplies an actuating signal the length of which corresponds to the difference detected by said comparing means and operative when the desired opening amount changes suddenly and in response to a signal from said sensing means to supply immediately a new actuating signal the length of which corresponds to a new difference.

2. An exhaust-gas recirculation system for an internal combustion engine according to claim 1, which comprises a temperature sensor generating an electric signal according to the temperature of cooling water, a load sensor generating an electric signal according to engine load, and an engine revolution sensor generating an electric signal according to engine revolution which, in combination, serve as said detecting means to detect the operating conditions of the engine.

3. An exhaust-gas recirculation system for an internal combustion engine according to claim 1, which comprises a main control device equipped with blind-zone setting means that causes the pulse actuating means to stop the generation of an output signal when the difference does not reach a preset limit.

4. An exhaust-gas recirculation system for an internal combustion engine according to claim 1, wherein said valve actuating means comprises a vacuum chamber communicating with a vacuum source through a first solenoid valve and with the atmosphere through a second solenoid valve and a diaphragm adapted to move in response to the vacuum in said vacuum chamber and connected to an exhaust-gas recirculation control valve.

5. An exhaust-gas recirculation system for an internal combustion engine according to claim 4, which comprises pulse actuating means to feed a signal to actuate the exhaust-gas recirculation control valve in an opening direction to said first solenoid valve and a signal to actuate the exhaust-gas recirculation control valve in a closing direction to said second valve.

* * * * *